(12) United States Patent (10) Patent No.: US 11,301,184 B2
Yamanishi (45) Date of Patent: Apr. 12, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Fumitake Yamanishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 512 days.

(21) Appl. No.: 16/123,681

(22) Filed: Sep. 6, 2018

(65) Prior Publication Data

US 2019/0087133 A1    Mar. 21, 2019

(30) Foreign Application Priority Data

Sep. 20, 2017 (JP) .............................. JP2017-180191

(51) Int. Cl.
G06F 9/44 (2018.01)
G06F 3/12 (2006.01)
G06F 8/656 (2018.01)
G06F 9/54 (2006.01)
H04N 1/00 (2006.01)

(52) U.S. Cl.
CPC ............ *G06F 3/123* (2013.01); *G06F 3/1217* (2013.01); *G06F 3/1225* (2013.01); *G06F 3/1284* (2013.01); *G06F 8/656* (2018.02); *G06F 9/542* (2013.01); *H04N 1/00* (2013.01); *H04N 1/00938* (2013.01); *H04N 2201/0094* (2013.01)

(58) Field of Classification Search
None
See application file for complete search history.

(56) References Cited

U.S. PATENT DOCUMENTS

| 9,110,760 | B2* | 8/2015 | Michishita | ................ G06F 8/65 |
| 2004/0060047 | A1* | 3/2004 | Talati | ...................... G06F 8/656 |
| | | | | 717/175 |
| 2011/0119333 | A1* | 5/2011 | Tamura | .............. H04N 1/00222 |
| | | | | 709/203 |
| 2013/0132935 | A1* | 5/2013 | Kuroki | .................... G06F 8/654 |
| | | | | 717/168 |
| 2014/0068317 | A1* | 3/2014 | Kanigicherla | ........ G06F 9/5011 |
| | | | | 714/2 |

FOREIGN PATENT DOCUMENTS

| JP | 2006-004177 A | 1/2006 |
| JP | 2014-115779 A | 6/2014 |
| JP | 5984621 B2 | 9/2016 |
| JP | 2017-142684 A | 8/2017 |

OTHER PUBLICATIONS

Aug. 31, 2021 Office Action issued in Japanese Patent Application No. 2017-180191.

* cited by examiner

*Primary Examiner* — Qamrun Nahar
(74) *Attorney, Agent, or Firm* — Oliff PLC

(57) ABSTRACT

An information processing apparatus includes a processor and a storage device. The storage device stores software including plural element programs to be executed by the processor. At least one of the plural element programs causes the processor to execute a specific process in the case where a different element program is being updated. The specific process includes handling a situation in which the different element program is being updated.

15 Claims, 14 Drawing Sheets

FIG. 11

| LEVEL 1 | UI LEVEL 2 | READING PROCESS COMPONENT | IMAGE PROCESSING COMPONENT | ACCUMULATION PROCESS COMPONENT | COMMUNICATION COMPONENT |
|---|---|---|---|---|---|
| SCAN | DOCUMENT SETTING: SINGLE-SIDED | ● | | | |
| SCAN | DOCUMENT SETTING: DOUBLE-SIDED | ● | | | |
| SCAN | DOCUMENT SETTING: AUTOMATIC | ● | | | |
| SCAN | SCAN SETTING: MONOCHROME | | ● | | |
| SCAN | SCAN SETTING: FULL COLOR | | ● | | |
| SCAN | SAVING FORMAT: PDF | | ● | | |
| SCAN | SAVING FORMAT: XCP | | ● | | |
| SCAN | TRANSMISSION PROTOCOL: FTP | | | | ● |
| SCAN | TRANSMISSION PROTOCOL: SMB | | | | ● |
| SCAN | TRANSMISSION PROTOCOL: WebDAV | | | | ● |
| SCAN | TRANSMISSION PROTOCOL: Mail | | | | ● |
| SCAN | NOT DISPLAYED ON SCREEN | | | ● | |
| COPY | | | | | |
| PRINT | | | | | |
| FAX | | | | | |
| SETTING | | | | | |
| AppA | | | | | |

| FUNCTION | | NUMBER OF TIMES OF USE | TIME BAND OF HEAVY USE |
|---|---|---|---|
| LEVEL 1 | LEVEL 2 | | |
| SCAN | DOCUMENT SETTING: SINGLE-SIDED | 200 | 10:00 - 17:00 |
| | DOCUMENT SETTING: DOUBLE-SIDED | 100 | 10:00 - 17:00 |
| | ... | | |
| | TRANSMISSION PROTOCOL: FTP | 40 | 16:00 - 17:00 |
| | TRANSMISSION PROTOCOL: SMB | 10 | 16:00 - 17:00 |
| | TRANSMISSION PROTOCOL: Mail | 250 | 10:00 - 15:00 |
| COPY | ... | | |
| PRINT | ... | | |
| FAX | ... | | |
| SETTING | ... | | |
| AppA | ... | | |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-180191 filed Sep. 20, 2017.

BACKGROUND

Technical Field

The present invention relates to an information processing apparatus and a non-transitory computer readable medium.

SUMMARY

According to an aspect of the present invention, there is provided an information processing apparatus including: a processor; and a storage device that stores software including plural element programs to be executed by the processor, in which at least one of the plural of element programs causes the processor to execute a specific process in a case where a different element program is being updated, the specific process including handling a situation in which the different element program is being updated.

BRIEF DESCRIPTION OF THE DRAWINGS

An exemplary embodiment of the present invention will be described in detail based on the following figures, wherein:

FIG. 11 illustrates an example of a table indicating the relationship of dependence between various items on a UI screen and element programs in the firmware;

DETAILED DESCRIPTION

An update of firmware of an information processing apparatus (built-in computer) built in a multi-function device (a device that has the functions of a printer, a scanner, a copier, a facsimile (FAX) device, etc.) will be described below as an example.

Figure 1:
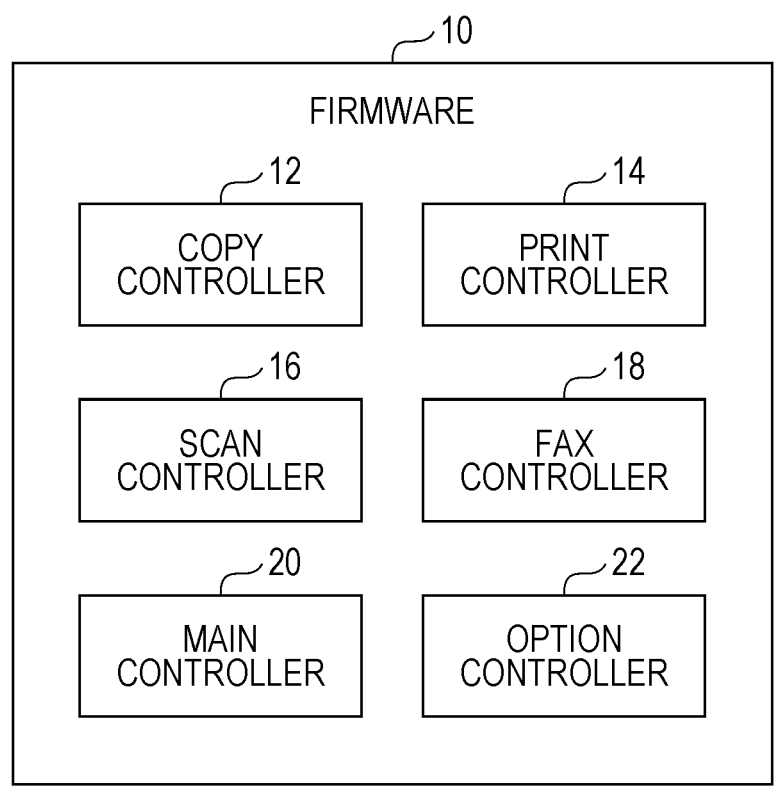
FIG. 1 illustrates the configuration of firmware of a multi-function device.

As illustrated in FIG. 1, for example, firmware 10 of the information processing apparatus in the multi-function device includes a copy controller 12, a print controller 14, a scan controller 16, a FAX controller 18, a main controller 20, and an option controller 22. Among such controllers, those other than the main controller 20 are programs for implementing application functions (services) provided by the multi-function device. That is, the copy controller 12 is a program for processing information for a copy service. The print controller 14 is a program for a print service for executing a print instruction over a network. The scan controller 16 is a program for implementing a scan service. The FAX controller 18 is a program for a FAX service. The option controller 22 is a program for implementing an optional service provided using an optional device (e.g. a post-processing device that performs stapling) mounted to the multi-function device. Plural optional devices may be mounted to the multi-function device. The option controller 22 is provided for each of such optional devices.

Figure 2:
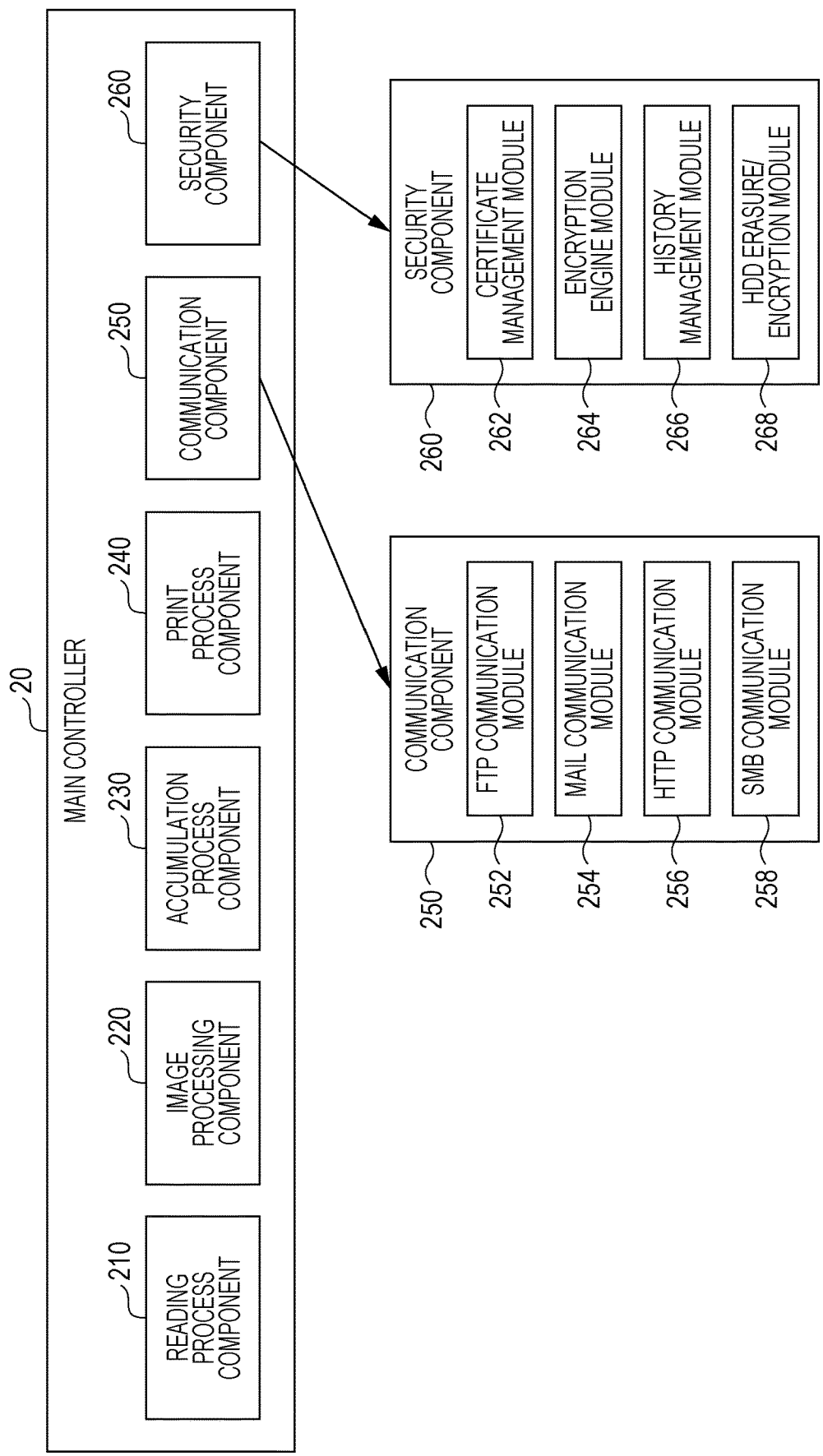
FIG. 2 illustrates the configuration of a main controller in the firmware.

The main controller 20 is a program for controlling the basic functions of the multi-function device. Examples of the control of the basic functions include control of a hardware mechanism in the multi-function device, functions for use in common to plural services, etc. FIG. 2 illustrates a detailed configuration of the main controller 20.

In the example of FIG. 2, the main controller 20 includes a reading process component 210, an image processing component 220, an accumulation process component 230, a print process component 240, a communication component 250, and a security component 260. The reading process component 210 is a program for controlling a process for reading a document image using a scan mechanism. The image processing component 220 is a program for controlling image processing (e.g. color space conversion and noise removal) on image data generated in the multi-function device by developing scan or print data. The accumulation process component 230 accumulates image data generated in the multi-function device or image data processed by the image processing component 220 in a mass storage device (such as a hard disk drive) of the multi-function device, and performs a process for reading the accumulated image data. The accumulation process component 230 also compresses image data to be accumulated, and expands the accumulated compressed image data. The print process component 240 governs control of a print mechanism at the time when image data are printed on a medium such as paper. The communication component 250 is a program that governs a communication process via a network such as a local area network and the Internet. The security component 260 is a program for carrying out a process for information security of the multi-function device.

The main controller 20 may include a component that performs a user interface (UI) process, a component that manages execution of a job, etc., although not illustrated.

The print process component 240 may be further divided into plural modules. In the example of FIG. 2, the communication component 250 and the security component 260 are illustrated to each include a group of modules.

For example, the communication component 250 has modules (programs) for processing with each of communication protocols for use in communication over a network, such as a File Transfer Protocol (FTP) communication module 252, a mail communication module 254, a HyperText Transfer Protocol (HTTP) communication module 256, and a Server Message Block (SMB) communication module 258. Besides the modules for each of the protocols illustrated in the drawing, the communication component 250 may further include a common process module (e.g. an execution control section 34 illustrated in FIG. 3 and discussed in detail later) that performs a process that is common to the modules for the plural protocols, although not illustrated.

Meanwhile, the security component 260 includes a certificate management module 262, an encryption engine module 264, a history management module 266, and a hard disk drive (HDD) erasure/encryption module 268. The certificate management module 262 is a module that manages digital certificates (of the multi-function device and a communication opponent) for use in communication, etc., performed by the multi-function device over a network. The encryption engine module 264 is a program for encrypting and decrypting data, and is used to encrypt and decrypt data to be exchanged with another device via a network, for example. The history management module 266 is a module that records and manages a history of use of the multi-function device. The HDD erasure/encryption module 268 is a module that protects information in an HDD which is a mass storage device built in the multi-function device, and encrypts data to be saved in the HDD and erases data in the HDD when the multi-function device is discarded, etc., for example. Besides the modules for each of the protocols illustrated in the drawing, the security component 260 may further include a common process module that performs a process that is common to the modules for the plural protocols, although not illustrated.

As illustrated in FIGS. 1 and 2, the firmware 10 is constituted of a group of element programs that form a hierarchical structure. The element programs are programs that serve as elements that constitute the firmware 10. In the illustrated example, the firmware 10 is constituted of plural element programs at the controller level (first level; FIG. 1), the controller is constituted of plural element programs at the component level (second level; FIG. 2), and the component is constituted of plural element programs at the module level (third level; FIG. 2). In the present exemplary embodiment, the firmware 10 may be updated as a whole (i.e. the entire firmware is treated as a single element program), or may be updated in the unit of an element program at each level, e.g. in the unit of a controller, a component, or a module. The three-level hierarchical structure described above is merely exemplary.

In the present exemplary embodiment, while a certain element program in the firmware 10 is updated, a process that does not use the certain element program may be executed. To this end, the element programs include a function (referred to as an "update support function") of executing a process for supporting an update in the case where a different element program is being updated. The update support function includes at least one of a process for detecting that a different element program is being updated and a process for notifying a UI component (not illustrated) that a different element program is being updated. The update support function may also include a function of standing by withholding its own process until an update of a different element program is finished and resuming the process which has been withheld when the finish of the update is detected. The "different element program" to be supported by the update support function of the element program is an element program as a request destination that the element program requests to perform a process, for example. For example, in the case where no acknowledgment is provided within a predetermined time when the element program requests a request destination element program to perform a process, the update support function determines that the request destination element program is being updated, and notifies the UI component that the request destination element program is being updated. The UI component knows from the notification that the request destination element program is being updated, and does not receive from the user an instruction to execute a process that requires the request destination element program, for example.

Figure 3:
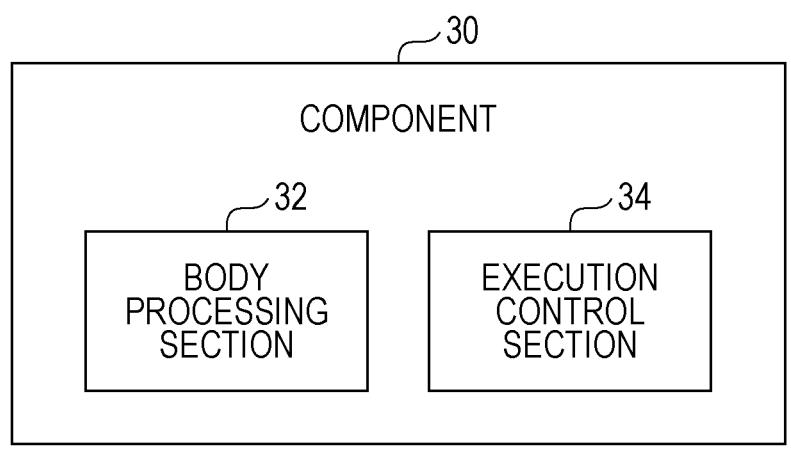
FIG. 3 illustrates a schematic configuration of each component.
Figure 4:
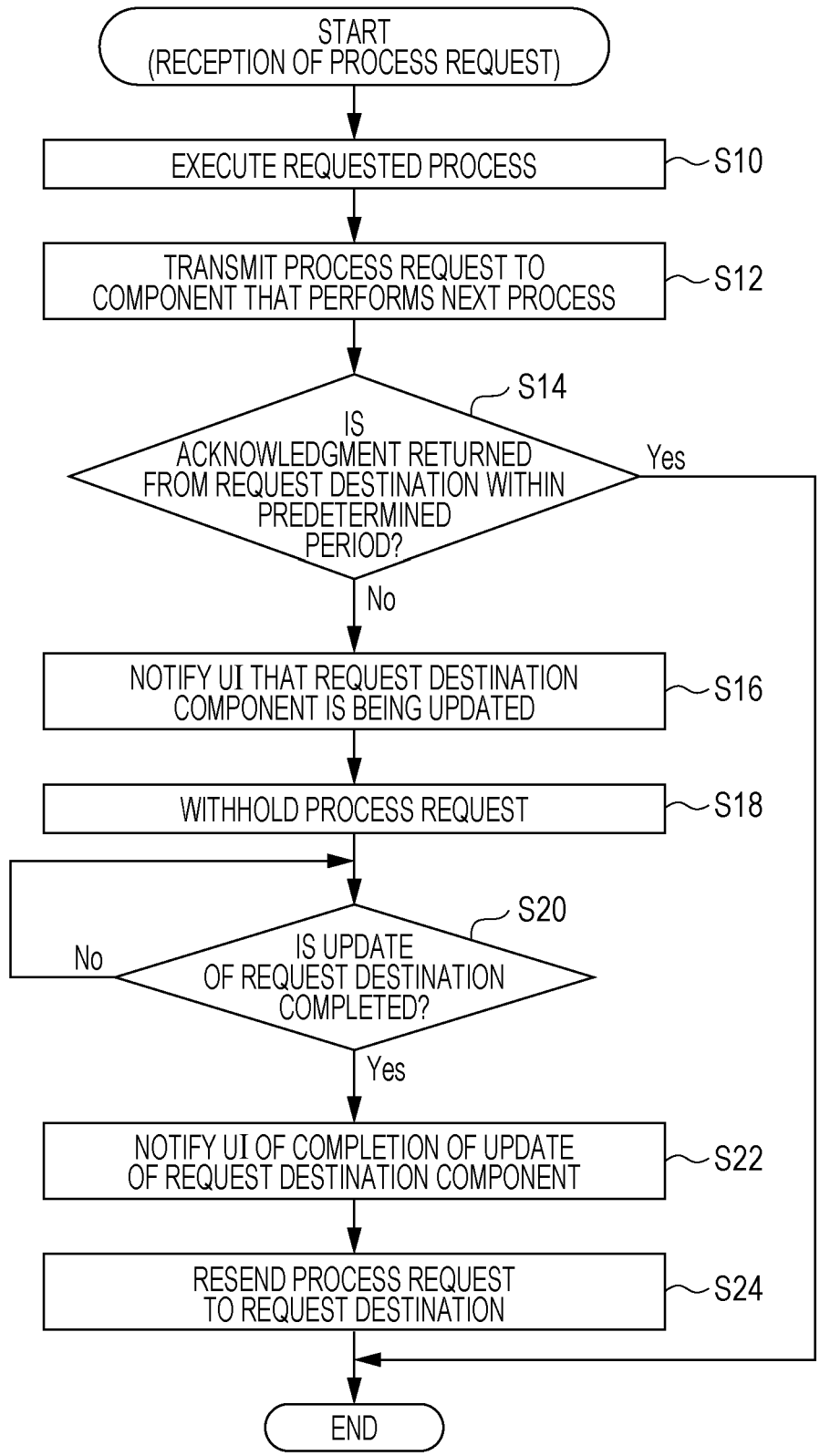
FIG. 4 illustrates a process procedure performed by an execution control section in the component.

As illustrated in FIG. 3, a component 30 such as the reading process component 210 and the communication component 250 has a body processing section 32 and an execution control section 34. The body processing section 32 carries out a process for a function that the component provides to the outside (such as a user, a different device, or a different element program), and may be modules (such as the FTP communication module 252 to the SMB communication module 258 of FIG. 2) of the communication component 250 for each of the protocols, for example. Meanwhile, the execution control section 34 controls execution of the process by the body processing section 32, and includes a function of exchanging an instruction and data with a different element program, the update support function discussed earlier, etc. An example of a process procedure performed by the execution control section 34 is illustrated in FIG. 4. In the case where the user instructs execution of a job using the UI of the multi-function device as a precondition for this process, element programs such as controllers, components, and modules in the firmware related to the job sequentially operate to execute a process for the job. The order in which the element programs operate has been determined in accordance with the content of the job, and the element programs are executed in accordance with the order. For example, each of a sequence of element programs to be executed in order to achieve a job executes a process upon receiving a process request from the preceding element program, and requests the following element program to execute a process that follows the process. For example, element programs that constitute the job reference job data that prescribe the order of execution of the element programs in the job to specify an element program that executes a process next (i.e. the transmission destination of a process request). The procedure of FIG. 4 indicates a process executed by one component 30 in the process of such a job.

Upon receiving a process request from a different element program, the execution control section 34 starts the process procedure of FIG. 4. The execution control section 34 causes the body processing section 32 to execute a process corresponding to the process request (S10). When the process is completed, the execution control section 34 transmits a process request to a component 30 that carries out the next process (S12). The component 30 as the request destination returns an acknowledgment when the process request is received. The execution control section 34 stands by for a predetermined time for an acknowledgment to be returned in response to the process request transmitted in S12 (S14). If an acknowledgment is returned within the predetermined time, the component 30 as the request destination should be operating normally, and thus the execution control section 34 ends the process. In the case where an acknowledgment is not returned within the predetermined time, it is indicated that the component 30 as the request destination is being updated and is not operating. In this case, the execution control section 34 notifies the UI component that the component 30 as the request destination is being updated (S16). Upon receiving this notification, the UI component indicates on a UI screen that the job is suspended because of the update and will be resumed soon after the update is finished, for example. In addition, the execution control section 34 withholds (stores) the process request for the component 30 as the request destination (S18), and stands by for the update of the component 30 as the request destination to be completed (S20), for example. The execution control section 34 may determine that the update is completed by regularly sending an inquiry to the request destination and receiving an acknowledgment, for example. When the completion of the update of the request destination component is detected, the execution control section 34 notifies the UI component that the update of the request destination component is completed (S22). Upon receiving the notification that the update of the request destination component is completed, the UI component indicates on the UI screen that the job which has been suspended is resumed. In addition, the execution control section 34 resends the process request which has been withheld to the request destination component (S24), and resumes execution of the job.

In the example of FIG. 4, in the case where it is determined that the component 30 as the request destination is being updated, the execution control section 34 withholds the process request, and resends the process request to the component 30 as the request destination after the update is completed. That is, in this example, execution of the job is suspended immediately before the component 30 as the request destination, and the process of the job is resumed by the component 30 as the request destination after the completion of the update.

In another example, in the case where it is detected that the component 30 as the request destination is being updated, a job that has been executed so far may be discontinued. In this case, upon detecting in S14 of the procedure of FIG. 4 that the request destination is being updated, the execution control section 34 notifies the UI component of such detection in S16, and discontinues the job (e.g. discards the job data discussed above which are management information on the job, or records that the job has been discontinued in the job data. In this example, the UI component which has been notified that the request destination component is being updated indicates that the job has been discontinued, and thereafter returns to the display of a normal menu screen. It should be noted, however, that the UI component does not receive an instruction to execute a job that uses the request destination component until the update of the request destination component is completed. Upon coming to know that the update of the request destination component is completed (e.g. when the UI is notified of the completion of the update when the request destination component itself is started after the completion of the update), the UI component may receive the job, reception of which has been prohibited so far.

While the component 30 is taken as an example in the example of FIGS. 3 and 4, similar control may be performed also for the element programs at the controller level and the module level.

Figure 5:
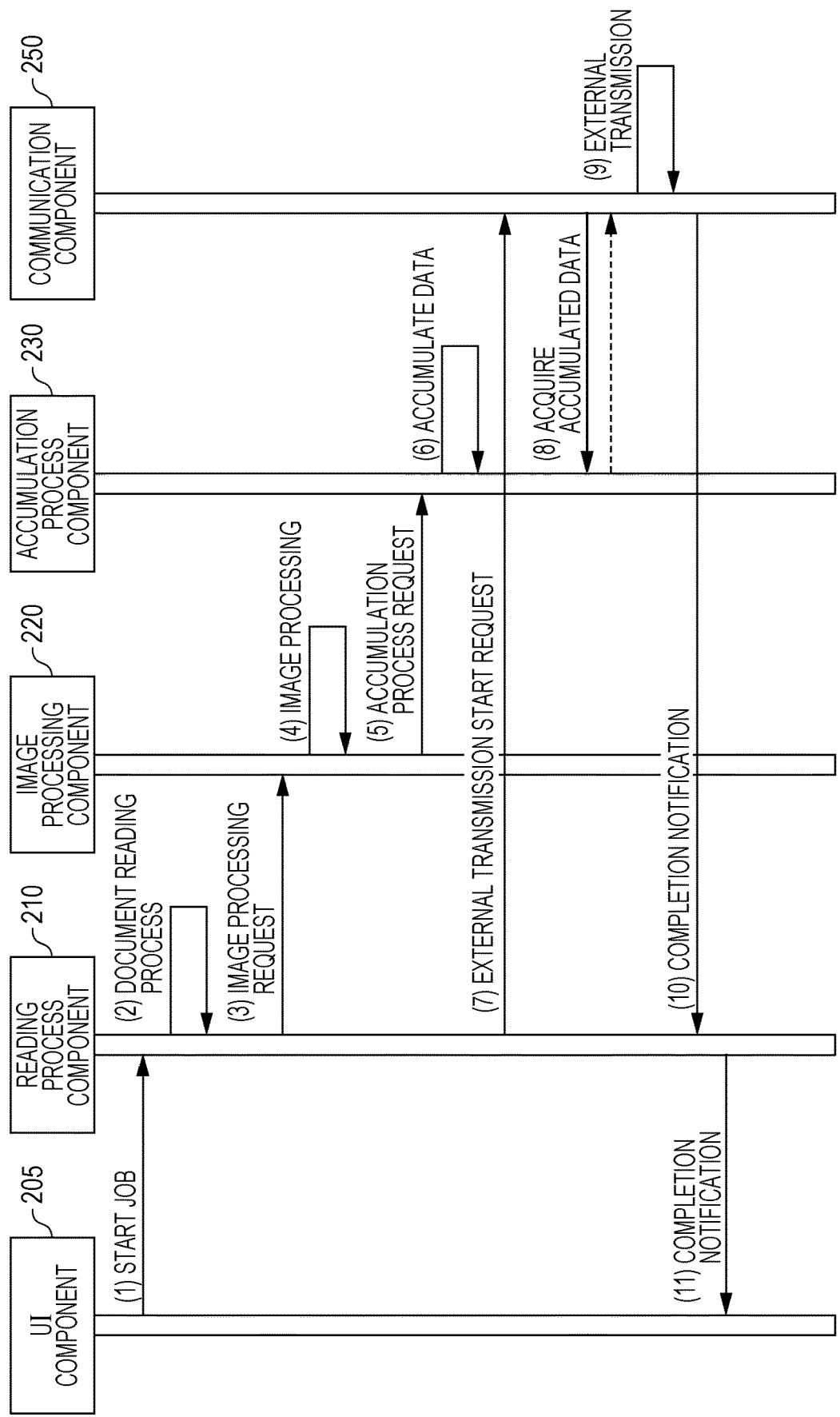
FIG. 5 illustrates the flow of operation of each component at the time when a scan-to-mail process is executed.
Figure 6:
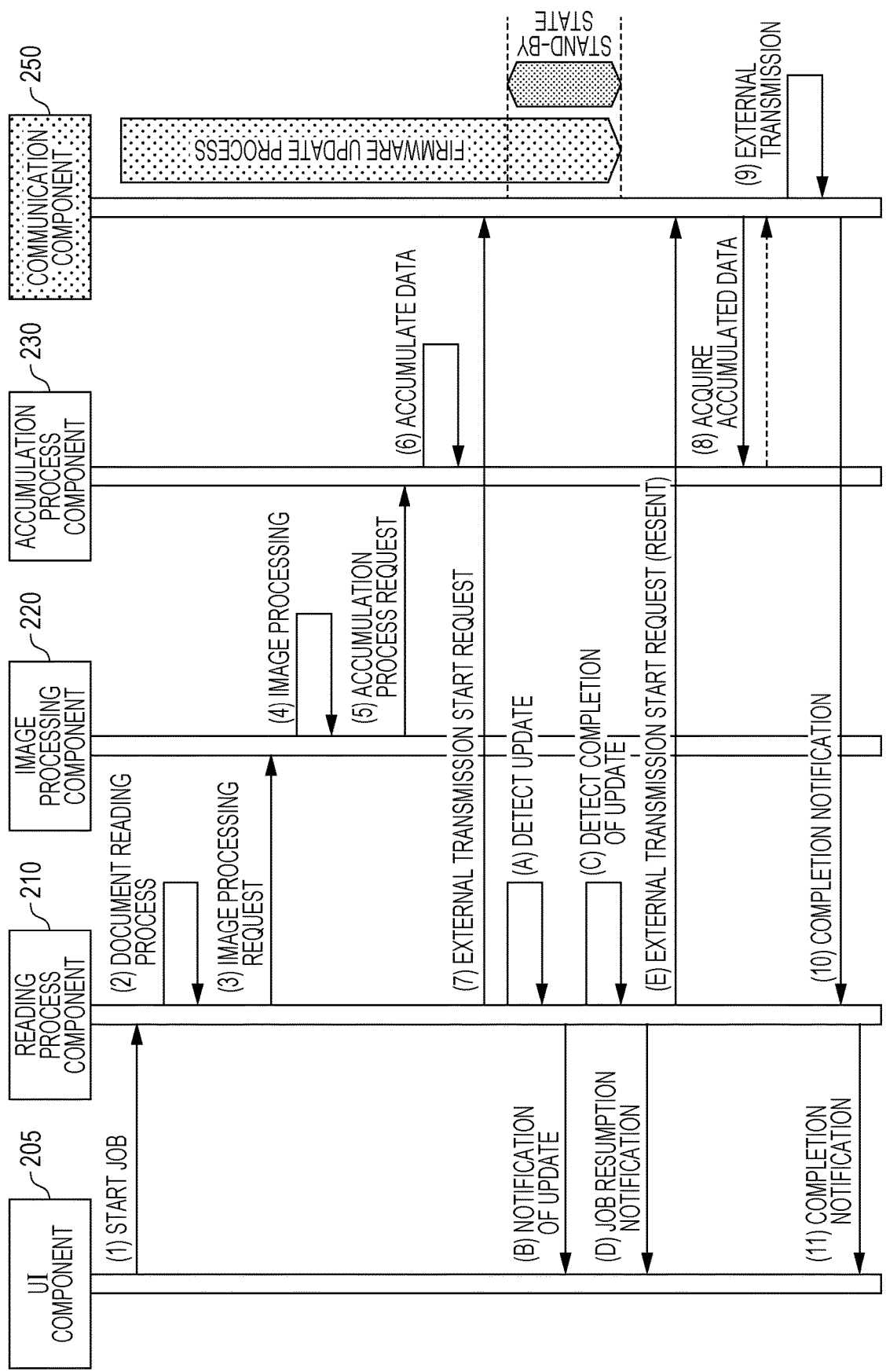
FIG. 6 illustrates the flow of operation of each component at the time when the scan-to-mail process is executed while a communication component is being updated.

A specific flow of a process for a job will be described with reference to FIGS. 5 and 6. FIGS. 5 and 6 illustrate the flow of a process among the components in the main controller 20 during execution of a "scan-to-mail" job. The "scan-to-mail" job is a job in which an image obtained by scanning a document is transmitted by electronic mail to a destination designated by the user. This job is executed by a UI component 205, the reading process component 210, the image processing component 220, the accumulation process component 230, and the communication component 250 operating in this order.

FIG. 5 illustrates the flow of a "scan-to-mail" job during normal times, that is, for a case where all the five components are in operation.

(1) In this flow, the user sets a document on a document feeding device, thereafter opens a scan screen on the UI screen, designates a reading method (whether monochrome or color) and a data format (PDF, etc.), designates electronic mail as the transmission protocol, and selects or inputs a mail address as the destination. When the user inputs an instruction to start execution of a job, the UI component 205 instructs the reading process component 210, which takes charge of the first process of the flow of a sequence of processes of a "scan-to-mail" job, to start the job. This instruction includes information on the arrangement of components, such as the reading process component 210, the image processing component 220, the accumulation process component 230, and the communication component 250, which indicates the flow of the "scan-to-mail" job.

(2) Upon receiving the job start instruction, the reading process component 210 reads the document on the document feeding device.

(3) When the reading is completed, the reading process component 210 sends an image processing request to the image processing component 220 which takes charge of the next process. This request includes an address of image data obtained by the reading.

(4) The image processing component 220 executes predetermined image processing on the image data in response to the request.

(5) When the image processing is completed, the image processing component 220 sends an accumulation process request to the accumulation process component 230 which takes charge of the next process. This request includes an address of image data after the image processing.

(6) The accumulation process component 230 compresses the image data, for example, and thereafter saves the image data in a mass storage device such as an HDD in response to the request. The accumulation process component 230 accumulates the image data in correlation with identification information that specifies the image data. This identification information has been generated by the reading process component 210, for example, when the job is started, and has been transferred to the accumulation process component 230. The identification information may be a path name of an accumulation destination so that the image data are accumulated at the path name.

(7) The reading process component 210 sends an external transmission start request to the communication component 250. This request includes the identification information which specifies the image data which are accumulated by the accumulation process component 230, designation of the transmission protocol (in this case, electronic mail), and information on the destination.

(8) Upon receiving the external transmission start request, the communication component 250 delivers the identification information which is included in the request to the accumulation process component 230, and demands the accumulated data. The accumulation process component 230 reads image data corresponding to the received identification information from a mass storage device (and expands the read data if compressed), and delivers the read image data to the communication component 250.

(9) The communication component 250 transmits an electronic mail, to which the image data which are acquired from the accumulation process component 230 are attached, to the destination which is included in the external transmission start request.

(10) When the transmission of the image data which are obtained as a result of the scanning is completed, the communication component 250 sends a completion notification to the reading process component 210 which made the request.

(11) The reading process component 210 which has received the completion notification from the communication component 250 sends a notification that the job is completed to the UI component 205. Upon receiving this notification, the UI component 205 displays a banner indicating that the "scan-to-mail" job is completed, for example, and thereafter returns to the display of a main menu screen 300.

FIG. 6 illustrates the flow of a process for a case where the communication component 250 is being updated when the user instructs execution of a "scan-to-mail" job. The reading process component 210, the image processing component 220, and the accumulation process component 230 are in operation.

Of the flow of the process illustrated in FIG. 6, (1) to (7) are the same as those during normal times (FIG. 5).

(A) Since the communication component 250 as the request destination is being updated, no acknowledgment is returned in response to the request in step (7) even when the predetermined time passes. In this case, the reading process component 210 (the execution control section 34 thereof) determines that the request destination is being updated. The reading process component 210 temporarily suspends the job, and stands by until the update is completed.

(B) In addition, the reading process component 210 notifies the UI component 205 that the communication component 250 is being updated. The UI component 205 controls screen display in accordance with the notification, and restricts reception of a job from the user (an example of such restriction will be discussed in detail later).

(C) The reading process component 210 stands by for the update of the communication component 250 to be completed, and detects such completion.

(D) When the update of the communication component 250 is completed, the reading process component 210 sends a job resumption notification indicating that the update of the communication component 250 is completed to the UI component 205. The UI component 205 cancels the restriction of job reception in response to the notification.

(E) The reading process component 210 resends the external transmission start request which has been withheld to the communication component 250.

Processes in the subsequent steps (8) to (11) are the same as those during normal times illustrated in FIG. 5.

An example of the UI screen which is displayed by the UI component 205 in the case where the notification in step (B) of the process of FIG. 6 is received will be described below.

Figure 7:
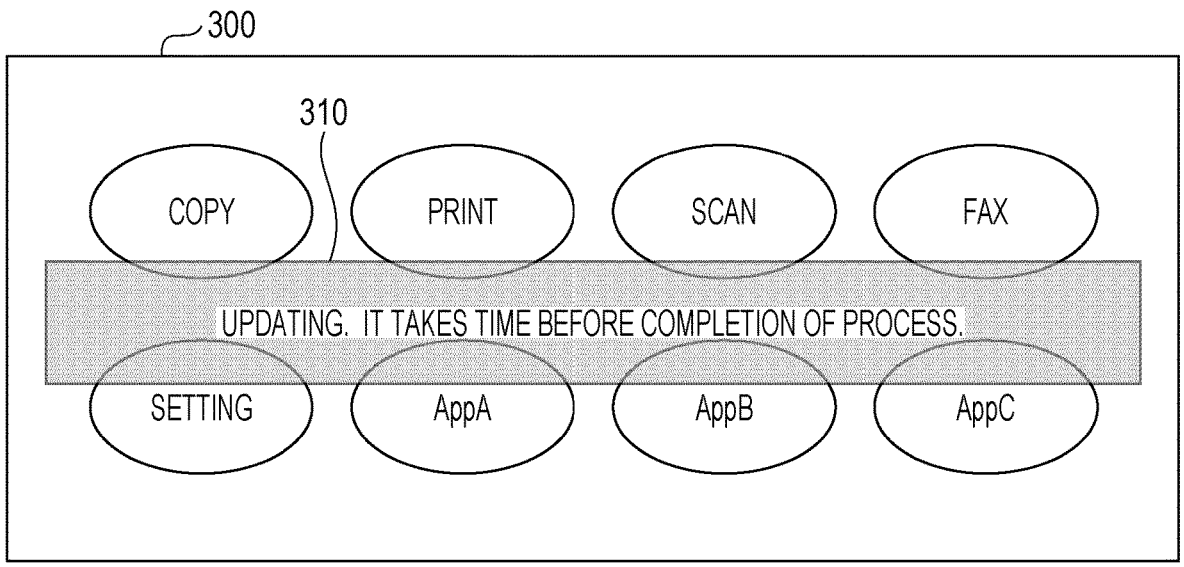
FIG. 7 schematically illustrates an example of a screen displayed on a user interface (UI) of the multi-function device when it is detected that the communication component is being updated.

In one example, the UI component 205 which has received this notification displays, on the screen being displayed (the main menu screen 300 in this example), a message banner 310 indicating that the communication component 250 is being updated as illustrated in FIG. 7, for example. In this example, the job is resumed soon after the update of the communication component 250 is completed, and thus language indicating that it takes time before the completion of the process (i.e. the completion of transmission of a mail to which the image which is obtained as a result of the scanning is attached), for example, is displayed in the message banner 310. At this time point, the scanning of the document has been finished, and thus the user may leave the multi-function device.

Figure 8:
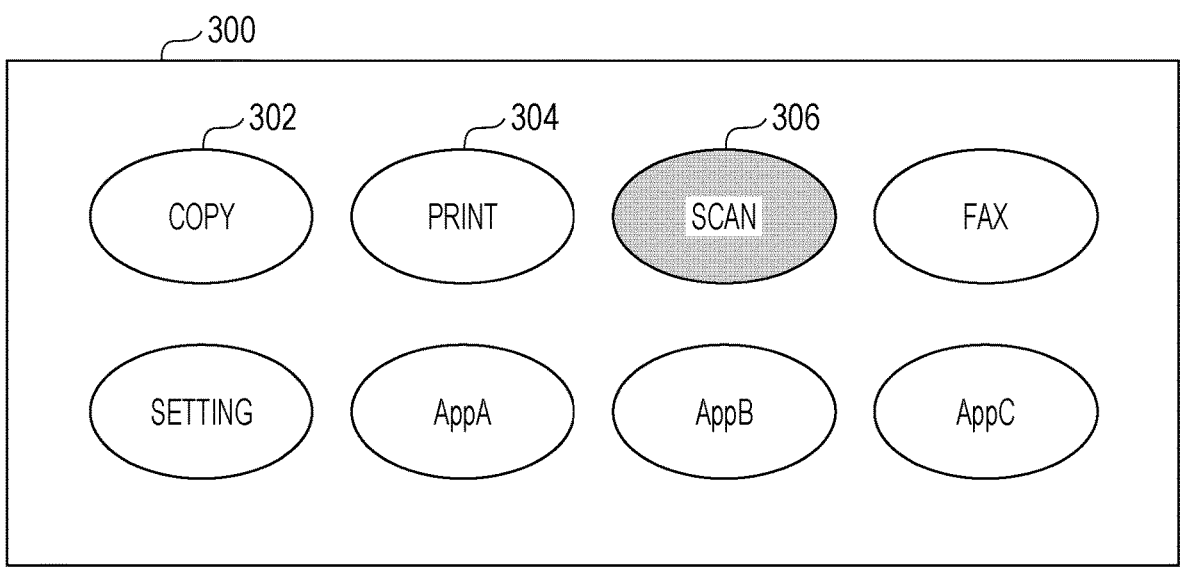
FIG. 8 schematically illustrates an example of a main menu screen displayed while the communication component is being updated.

The UI component 205 may receive an instruction to execute another job after the display of the message banner 310 is ended. It should be noted, however, that the communication component 250 is being updated at this time point and therefore a job that uses the communication component 250 may not be executed. Thus, the UI component 205 displays a UI screen on which a job that uses the communication component 250 has been disabled. FIG. 8 illustrates the main menu screen 300 in such a state. Graphical user interface (GUI) buttons for calling up setting screens for various functions, such as a copy button 302, a print button 304, and a scan button 306, are displayed on the main menu screen 300. When the user depresses any of the buttons on the main menu screen 300 which is displayed on a touch screen, the UI component 205 displays a setting screen for a function corresponding to the button, and receives from the user an input of individual setting items for the function. In the case where the communication component 250 is being updated and is not operating, communication may not be made by way of the Internet, and thus the scan function may not be used. This is because an image obtained as a result of scanning may not be transmitted using electronic mail or other communication protocols. The functions other than scanning such as copy and print may be used as normal even if the communication component 250 is not operating (FAX transmission is performed by way of a telephone line, and therefore does not use the communication component 250). Therefore, the scan button 306 on the main menu screen 300 is grayed out (in an inconspicuous display state in a gray color) in order to indicate that the scan button 306 has been disabled, and the UI component 205 does not open a setting screen for scanning even if the user presses the scan button 306. Buttons for functions other than scanning are in a normal state, and the UI component 205 opens a setting screen for a corresponding function if any of such buttons is depressed.

Figure 9:
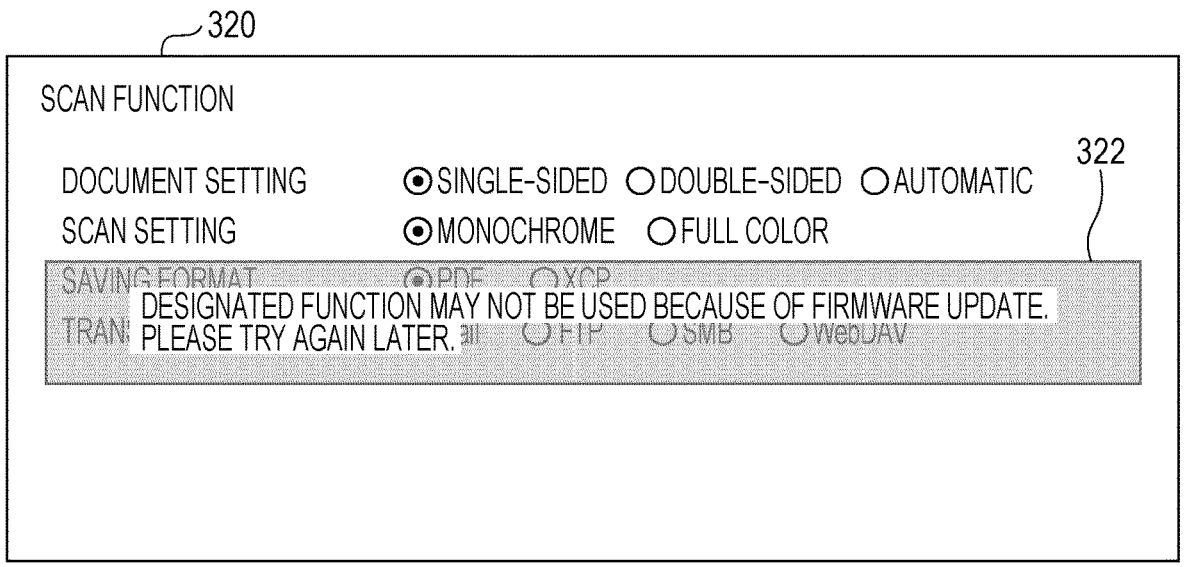
FIG. 9 schematically illustrates an example of a setting screen for a scan function displayed while the communication component is being updated.

In FIG. 8, a function that is unusable because of the effect of an element program (e.g. the communication component 250) being updated has been disabled on the main menu screen 300. However, this is merely exemplary. Alternatively, an unusable function may be selectable (by depressing a corresponding button) on the main menu screen 300, and an indication that the function is unusable may be displayed on a setting screen for the function that opens after the selection. FIG. 9 illustrates a scan setting screen 320 that opens when the scan button 306 on the main menu screen 300 is depressed while the communication component 250 is being updated as with FIG. 8. Input fields for designating document setting, scan setting, saving format, and transmission protocol are displayed on the scan setting screen 320. In this example, in addition, a message banner 322 indicating that a function designated by the user (in this case, the scan function) may not be used for the time being because of the update of the firmware is displayed on the scan setting screen 320. The user comes to know from the message banner 322 that the scan function may not be used for the time being.

In the case where the scan function of the multi-function device supports not only a method of transmitting the result of scanning by way of a network but also a method of writing the result of scanning into a portable recording medium connected locally, the latter method may be used even while the communication component 250 is being updated. In this case, the UI component 205 may make it possible to depress the scan button 306 on the main menu screen 300, and disable (gray out) a select field 324 for the transmission protocol for transmission of the result of scanning on the scan setting screen 320 (see FIG. 10) which opens when the scan button 306 is depressed.

Figure 10:
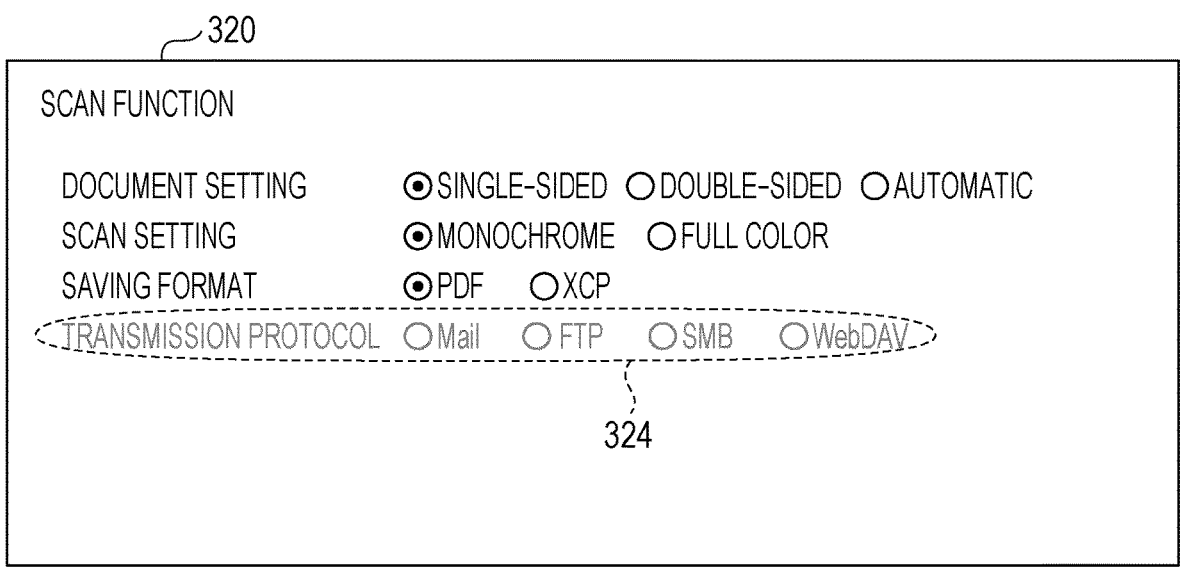
FIG. 10 schematically illustrates another example of the setting screen for the scan function displayed while the communication component is being updated.

In the case where only the FTP communication module 252, for example, in the communication component 250 is being updated, only FTP may be disabled (grayed out) in the select field 324 for the transmission protocol on the setting screen 320 of FIG. 10, although not illustrated. In the case where an update is being performed in the unit of a module in this way, only a function (corresponding to an item displayed on the UI screen) that depends on the module being updated may be disabled.

In this way, the UI component 205 receives, on the UI screen, selection of a function that is executable without using an element program being updated.

In order to generate the UI screens on which reception of a function is restricted illustrated in FIGS. 8 to 10, the UI component 205 has a table that indicates the relationship of dependence between the items on the UI screen and the element programs. An example of this table is illustrated in FIG. 11. In the table of this example, the vertical axis indicates items (e.g. options indicated in the select field such as document setting) displayed on a screen (e.g. the scan setting screen 320) at the second level that opens when an item (such as the scan button 306) displayed on a screen (main menu screen 300) at the first level ("level 1") is selected, for each of the items displayed on the screen at the first level. In addition, the horizontal axis of the table indicates the components. A value (indicated by a black dot in the drawing) that indicates the relationship of dependence is set in cells at which a row of an item at level 2 and a column of a component on which the item depends intersect each other. For example, FTP as an option of the transmission protocol depends on the communication component 250, but does not depend on the other components. The UI component 205 does not receive selection of an item at level 2 from the user while a component on which the item depends is being updated. For example, in the case where the communication component 250 is being updated, the UI component 205 does not receive selection of the four options (such as FTP) of the transmission protocol from the user.

While FIG. 11 is a table of the relationship of dependence at the component level, the UI component 205 additionally has tables of the relationship of dependence at the module level (such as the FTP communication module 252 of FIG. 2) and the controller level (see FIG. 1). The UI component 205 references a table that matches the level of the element program being updated to decide whether or not to receive an input of each of the items on the UI screen. In the example of the process of FIG. 6, for example, the UI component 205 detects on the basis of the notification from the reading process component 210 that the communication component 250 is being updated, and references the table of the relationship of dependence at the component level illustrated in FIG. 11 to invalidate (disable) options of the transmission protocol on the screen (scan setting screen 320) at level 2.

Figure 12:
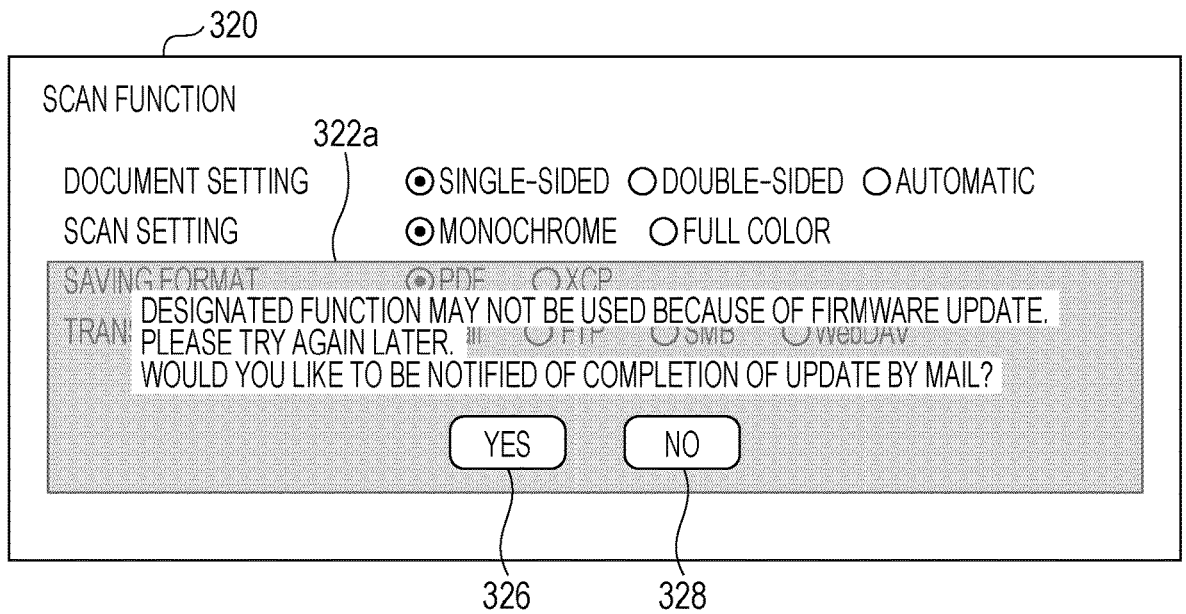
FIG. 12 schematically illustrates an example of a screen for receiving an instruction as to whether or not a notification is required after the completion of an update, the screen being displayed while the firmware is being updated.

With the screen display illustrated in FIGS. 8 to 10, the user is able to know that the function that he/she desires is currently unavailable, but is unable to know when the update is finished and the function becomes available. Thus, the user may be notified of the completion of the update by electronic mail, for example, when the update is completed in the case where the user desires. For example, in the case where the user is registered in the multi-function device and uses the multi-function device by logging in using an IC card or the like with user authentication information as with a multi-function device in an office, the multi-function device may send an electronic mail to the user if an electronic mail address of the user is registered in an account of the user. For example, as illustrated in FIG. 12, language that inquires whether or not the user desires to be notified when the update is completed and buttons 326 and 328 for use to input whether or not he/she desires to be notified are displayed in a message banner 322A indicating that the function that he/she desires is being updated and is unavailable. In the case where the user desires to be notified when the update is completed, the multi-function device sends an electronic mail indicating that the update is completed to the electronic mail address of the user.

Figure 13:
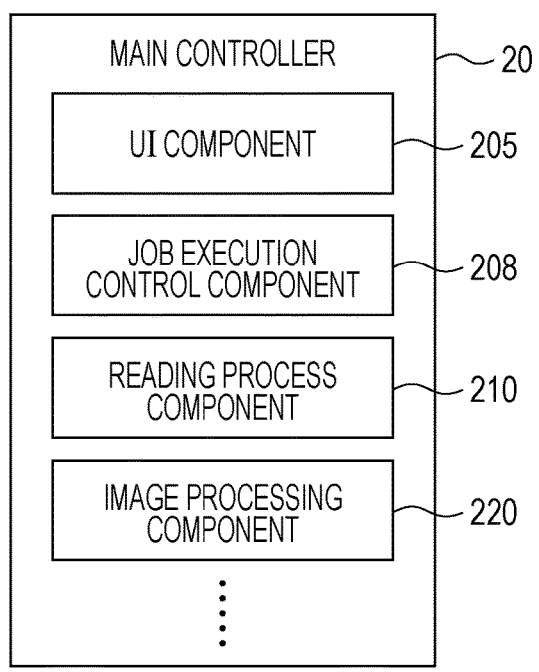
FIG. 13 illustrates the configuration of the main controller including a job execution control component that controls screen display, etc., related to an update.

Next, another example will be described with reference to FIGS. 13 to 15. In this example, the main controller 20 of the firmware of the multi-function device includes a job execution control component 208, in addition to the UI component 205, the reading process component 210, the image processing component 220, etc., described already. The job execution control component 208 controls execution of a job instructed by the user for the UI component 205. That is, the job execution control component 208 receives information (job data) on a job designated by the user for the UI component 205, and instructs components that constitute the flow of processes of the job to sequentially start the processes. Upon receiving the instruction to start the processes from the job execution control component 208, each of the components executes the process of the component, and responds to the job execution control component 208 with the result of the process when the process is completed. Upon receiving the response, the job execution control component 208 instructs the next component to start the process. In FIG. 13, the job execution control component 208 is provided in the main controller 20. However, a similar job execution control function may be prepared as an element program at the controller level (see FIG. 1).

In the example of FIG. 13, when an update of an element program of the firmware is started, an updater program for executing an update process sends a notification of the start of the update of the element program to the job execution control component 208. This notification includes identification information on the element program. In addition, when the update of the element program is completed, the updater program sends a completion notification including the identification information on the element program to the job execution control component 208. The updater program may be included in the firmware 10, or may be downloaded into an information processing section of the multi-function device from the outside (e.g. a server on a network or a terminal used by a maintenance worker for the multi-function device) together with update information on the element program.

Figure 14:
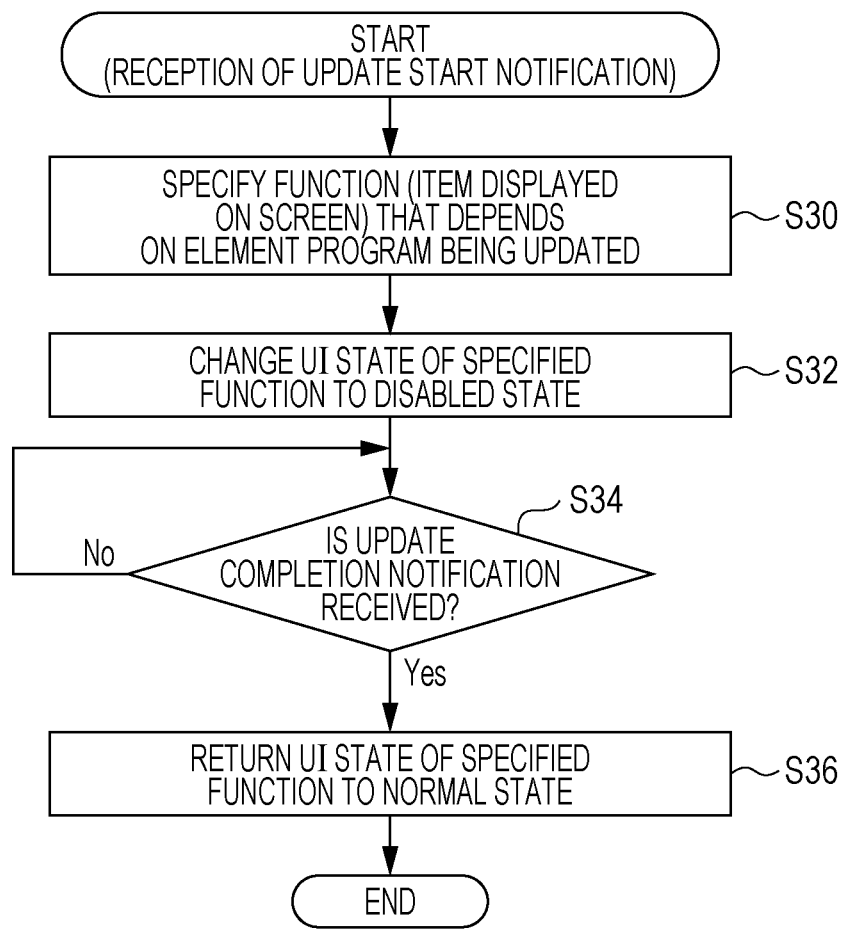
FIG. 14 illustrates a process procedure performed by the job execution control component.

FIG. 14 illustrates the procedure of a process related to an update of the firmware performed by the job execution control component 208. The procedure of FIG. 14 is started upon notification of the start of the update from the updater program. In this procedure, the job execution control component 208 first specifies a function (corresponding to an item on the UI screen) that depends on an element program to be updated indicated by the notification (S30). This specification may be performed by a procedure that is similar to that discussed above using the table (FIG. 11) of the relationship of dependence discussed above. Next, the job execution control component 208 causes the UI component 205 to change the UI state of the function specified in S30 to a disabled state (S32). Consequently, the UI component 205 displays a UI screen on which the function which depends on the element program being updated has been disabled as illustrated in FIG. 8, 9, or 10. After that, the job execution control component 208 stands by to receive a completion notification indicating that the update of the element program is completed from the updater program (S34). In the case where the completion notification is received, the job execution control component 208 instructs the UI component 205 to return the UI state of the function specified in S30 to a normal state (a state in which selection or an input is received) (S36). After that, the UI component 205 displays a normal UI screen, and receives an instruction from the user as normal.

In the example of FIG. 14, an instruction to execute a function that depends on an element program being updated is not received. In another example, in contrast, an instruction to execute a function that depends on an element program being updated may even be received in a particular case. The particular case may be a case where the element program being updated is positioned later than the accumulation process in the order of execution of element programs (e.g. the order of arrangement of the four components, namely the reading process component 210 to the communication component 250, in the example of FIG. 5) in the process flow of the function (job). That is, a multi-function device that handles large data such as image data occasionally temporarily accumulates an input image or a generated image in a mass storage device, and thereafter performs the subsequent processes. A memory of the multi-function device is not necessarily able to store image data for all pages of one job. Therefore, in the case where an element program not later than the accumulation process in the order of execution of the element programs in the process flow of the job is being updated and the process may not be executed, the results of processes performed by a group of element programs earlier than the element program have not been accumulated, or may not necessarily be held on the memory, and thus the job may not be withheld with the results of the processes up to a stage before the element program being updated held. In the case where an element program later than the accumulation process in the process flow is being updated, in contrast the job may be temporarily withheld at a stage at which the accumulation process is completed, and the job may be resumed at a step (element program) that follows the accumulation process in the process flow after the update is completed. A process procedure performed by the job execution control component 208 in this example is illustrated in FIG. 15.

Figure 15:
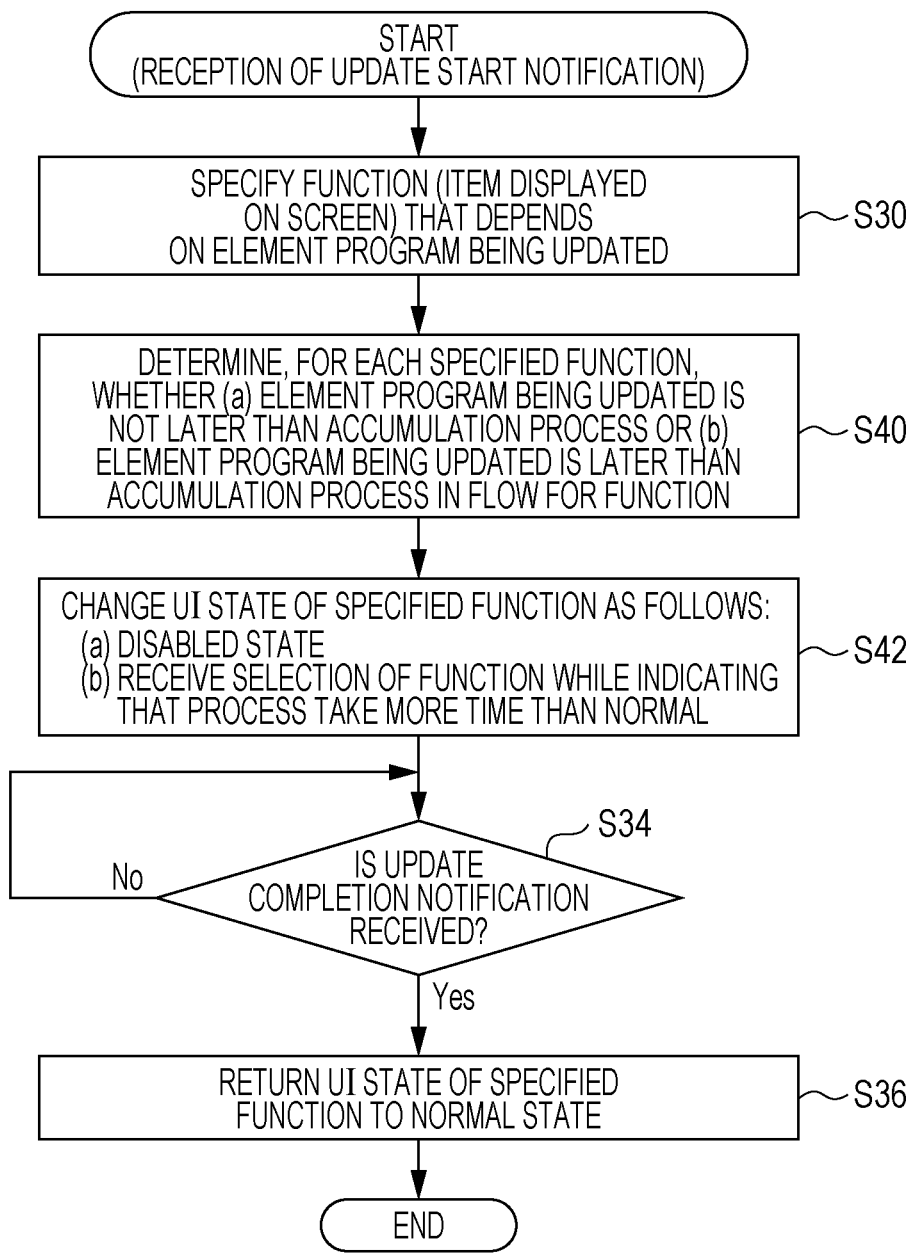
FIG. 15 illustrates another example of the process procedure performed by the job execution control component.

In the procedure of FIG. 15, as in the case of FIG. 14, the job execution control component 208 first specifies a function that depends on an element program to be updated (S30). Next, the job execution control component 208 determines, for each specified function, whether the element program to be updated is not later than the accumulation process (e.g. the accumulation process component 230) (case (a)) or is later than the accumulation process (case (b)) in the process flow for the function (S40). The job execution control component 208 holds information on the process flow of each function (job), and thus references such information to make a determination. For a function that falls under case (a), the UI component 205 is instructed to disable such a function as in the procedure of FIG. 14. For a function that falls under case (b), the UI component 205 is instructed to receive selection of such a function while displaying a message indicating that the process takes time because of the ongoing update (S42). After that, the job execution control component 208 executes the processes in S34 to S36 in the procedure of FIG. 14.

An update of the firmware of the multi-function device is executed when update information on the firmware is distributed from a server on the Internet that distributes such update information, or when the maintenance worker connects a maintenance terminal to the multi-function device to start a firmware update process, for example. In the present exemplary embodiment, the multi-function device is not completely unusable, even while the firmware is being updated, since functions that do not depend on the element program being updated are still available. However, the multi-function device is unusable during the update for users who desire to use a function that depends on the element program being updated. An example of control for reducing the inconvenience of such users will be described below.

Figures 16, 17:
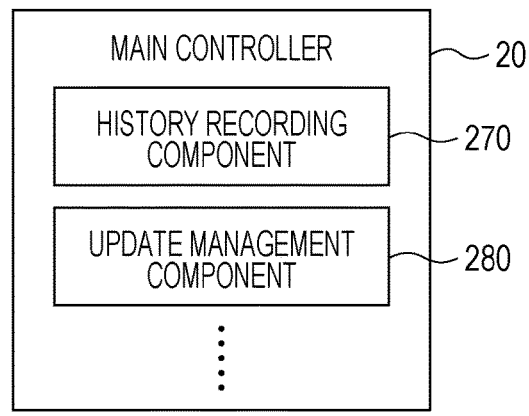
FIG. 16 illustrates the configuration of a main controller according to a modification.
FIG. 17 illustrates the results of summation of the history of use of various functions of the multi-function device.

As illustrated in FIG. 16, the main controller 20 in this example has a history recording component 270 and an update management component 280.

The history recording component 270 records a history of use of the multi-function device. The history of use may indicate which function was used (or use of which function was demanded) and when. The functions of the multi-function device have a hierarchical structure corresponding to the hierarchical structure (see FIGS. 1 and 2) of the element programs. Thus, when a job is executed, for example, which function at each level was used in the job is recorded in use history information in correlation with the date and time of the execution. An example of the use history information is "16:37:25, Aug. 30, 2017, scan, single-sided, monochrome, PDF, electronic mail". Among these, scan is at the component level, and the remaining elements such as single-sided and monochrome are at the module level.

The history recording component 270 may record not only history information on jobs executed actually, but also history information on jobs, execution of which was instructed by the user but which were not executed because of an update of the firmware. For example, although the scan function may not be used while the reading process component 210 is being updated, selection of the scan button 306 may be received on the main menu screen 300 (see FIG. 8), and an indication (message banner 322) that scanning may not be used because of an update may be displayed on the scan setting screen 320 (see FIG. 9) which is displayed in response to the selection, as discussed above. In this event, use of the scan function by the user is recorded in the history. That is, the number of times of use of scanning is incremented even though scanning is not actually executed. Consequently, the degree of demand for each function by the user is recorded in the history of use, and reflected in summation to be described next.

In addition, the history recording component 270 has a function of summarizing the recorded history of use. In this summation, the total number of times of use of each function and the time band in which each function is frequently used (called "time band of heavy use") are calculated. For example, a time band in which the number of times of use of a certain function per unit time (or the proportion of such a number of times to the total number of times of use of the certain function) is equal to or more than a threshold may be defined as the time band of heavy use of the certain function. FIG. 17 illustrates an example of summation result data generated by the history recording component 270. In this example, the number of times of use and the time band of heavy use of each of the functions at level 2 (module level), which is subordinate to the scan function at level 1 (component level), are indicated for the scan function. The time band of heavy use may be calculated separately for weekdays and holidays, or for each of the days of the week, and recorded in the summation result data.

Returning to the description of FIG. 16, the update management component 280 references the summation result data on the history of use which are generated by the history recording component 270 to manage execution of a process for updating the firmware. That is, the update management component 280 performs control, in a time band of heavy use of a certain function indicated in the summation result data, such that a process for updating an element program, on which the certain function depends, is performed as little as possible. An update with a high degree of urgency may have to be executed in the time band of heavy use. Even in such a case, control is performed such that the number of functions that may not be used by the user during the update is as small as possible.

Figure 18:
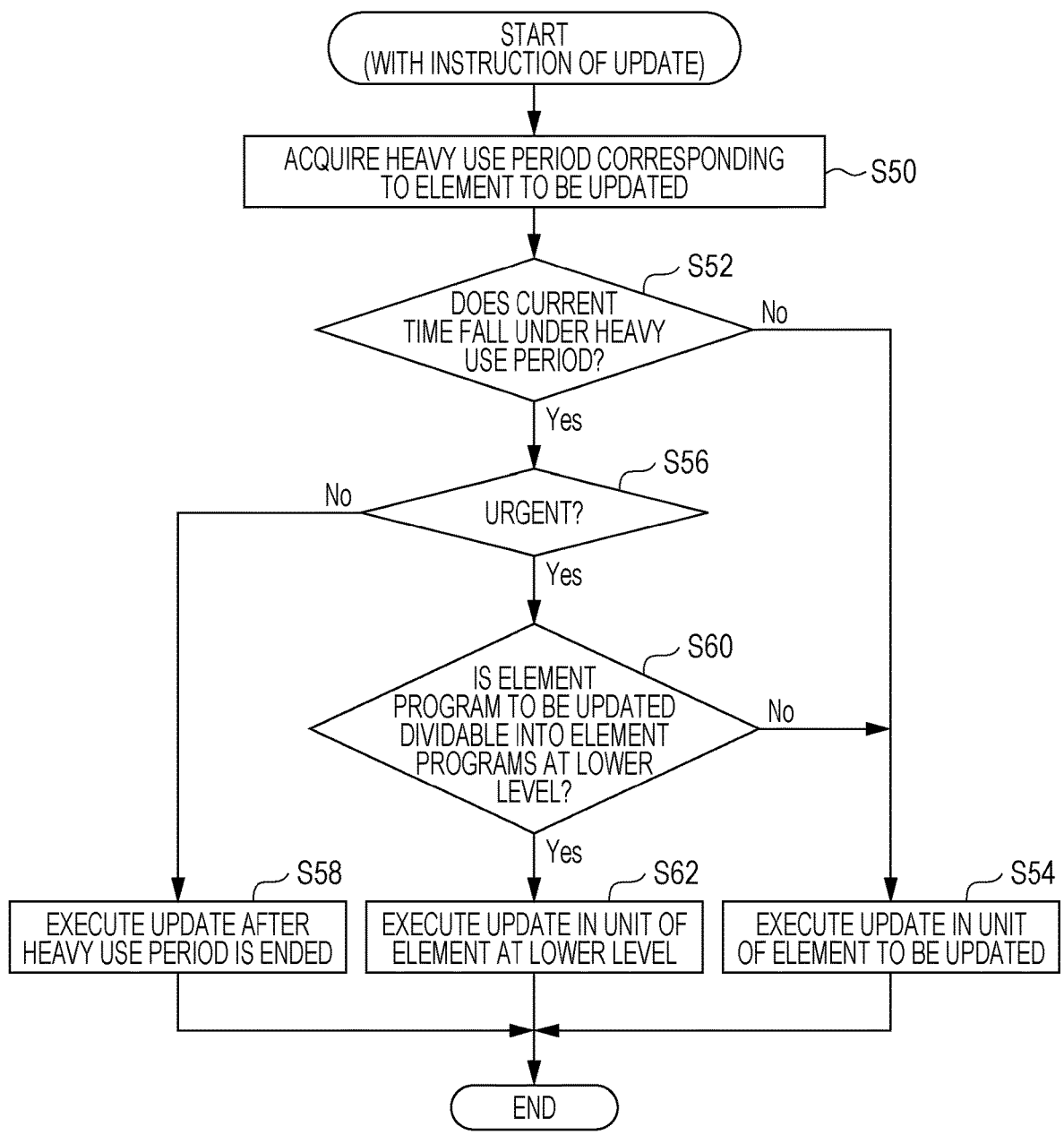
FIG. 18 illustrates a process procedure performed by an update management component.

FIG. 18 illustrates a process procedure performed by the update management component 280. This procedure is executed in the case where an instruction of a firmware update is sent from a server or the like to the multi-function device. The instruction includes data for the update and information that indicates which element program in the firmware the data are for. The data for the update include update data for element programs at each level in accordance with the hierarchical structure (see FIGS. 1 and 2) of the element programs in an identifiable form. For example, the update data for the communication component 250 include update data for each of the modules to be updated, among the modules such as the FTP communication module 252 which are subordinate to the component, in an identifiable state.

Upon receiving an instruction of an update of an element program to be updated, the update management component 280 acquires from the summation result data a time band of heavy use of a function corresponding to the element program (S50). For example, in the case where an instruction of an update of the reading process component 210 is received, the update management component 280 acquires a time band of heavy use of the reading process component 210. Next, the update management component 280 determines whether or not the current time falls under the time band of heavy use (S52). In the case where the current time does not fall under the time band of heavy use, the user is not significantly affected if the instructed update is executed now, and thus the update management component 280 executes the update (S54). In this update, the element program to be updated is updated as a whole, rather than being divided to be updated separately.

In the case where it is determined in S52 that the current time falls under the time band of heavy use, the update management component 280 determines whether or not the current update is urgent (S56). Whether or not the update is urgent is designated as a parameter of the update instruction, and thus may be determined with reference to the parameter. In the case where it is determined that the update is not urgent, the update management component 280 sets an update schedule such that the current update is executed after the time band of heavy use is ended (S58). After that, when the scheduled time comes, the update management component 280 updates the element program to be updated using data for the update that have been saved.

In the case where it is determined in S56 that the current update is urgent, the update management component 280 determines whether or not the element program to be updated currently is dividable into element programs at a lower level (S60). In the example of FIG. 2, in the case where the communication component 250 is to be updated currently, the result of the determination in S60 is Yes since the communication component 250 is dividable into plural modules, such as the FTP communication module 252, at a lower level. In the case where the FTP communication module 252 is to be updated currently, meanwhile, the result of the determination in S60 is No since the FTP communication module 252 is at the lowest level of the hierarchical structure.

In the case where the result of the determination in S60 is No, the update management component 280 updates the element program to be updated (S54).

In the case where the result of the determination in S60 is Yes, the update management component 280 divides the element program to be updated into plural element programs at a lower level, and updates the element programs at the lower level one by one (S62). If the element program to be updated is updated as a whole, any of the functions that depend on the element program may not be used during the update (or there may be a constraint such as the update taking much time). If the element program is divided into element programs at a lower level to be updated separately, in contrast, only a function that depends on an element program at the lower level being updated at a specific time point may not be used at the specific time point, and it does not happen that any of the functions that depend on the element program to be updated may not be used at the same time. It takes less time to update an element program to be updated as a whole than the element program to be updated is divided into plural element programs at a lower level to be updated separately. Thus, in this example, the element program is updated as a whole in the case where the user is not significantly affected even if the element program is updated as a whole (in cases other than during the time band of heavy use, etc.).

The process illustrated in FIG. 18 is merely exemplary. In another example, when an update is instructed, the update may be executed immediately if the current time does not fall under the time band of heavy use of a function that depends on an element program to be updated, and the update may be executed after the time band of heavy use if the current time falls under the time band of heavy use of such a function. In still another example, when an update is instructed, an element program may be updated as a whole if the current time does not fall under the time band of heavy use of a function that depends on the element program to be updated, and the element program may be divided into element programs at a lower level to be updated sequentially if the current time falls under the time band of heavy use of such a function. In addition, an element program, on which a function that is used a large number of times per unit time depends, may be divided into element programs at a lower level to be updated sequentially, and an element program, on which a function that is used a large number of times per unit time does not depend, may be updated as a whole.

In the example described above, the firmware of the multi-function device is to be updated. However, the technology according to the present exemplary embodiment is also applicable to an update of software for information processing apparatuses other than the multi-function device in general.

The information processing by the multi-function device described above, etc., is implemented by causing a built-in computer to execute a program that represents the functions of the device. Here, the computer has a circuit configuration in which, for example, pieces of hardware such as a processor such as a central processing unit (CPU), a memory (principal storage) such as a random-access memory (RAM) and a read-only memory (ROM), an HDD (hard disk drive) controller that controls an HDD, various input/output (I/O) interfaces, and network interfaces that control connection with a network such as a local area network are connected via a bus, for example. A disk drive that reads data from and/or writes data into a portable disc recording medium such as a compact disk (CD) and a digital versatile disk (DVD), a memory reader/writer that reads data from and/or writes data into a portable non-volatile recording medium according to various standards such as a flash memory, etc. may be connected to the bus by way of the I/O interfaces, for example. A program that describes the content of processes performed by the functional modules described above is stored in a stationary storage device such as the hard disk drive to be installed on the computer by way of a recording medium such as a CD and a DVD or by way of a communication unit such as a network. The program stored in the stationary storage device is read by the RAM and executed by the processor such as the CPU to implement the group of functional modules described above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor; and
a hardware memory that stores software including a plurality of element programs to be executed by the processor,
wherein at least one of the plurality of element programs causes the processor to execute a specific process upon detecting that a different element program is being updated, the detection being performed by transmitting a process request to the different element program and determining that an acknowledgement is not returned from the different element program within a predetermined period of time, the specific process including suspending the process request and automatically re-sending the process request to the different element program upon detecting that the update of the different element program is completed.

2. The information processing apparatus according to claim 1, further comprising
a screen generation unit that generates an operation screen, wherein
the specific process includes notifying the screen generation unit that the different element program is being updated, and
the screen generation unit generates a first operation screen indicating that there is a constraint on use of a function that uses the different element program, among a plurality of functions that the information processing apparatus provides to a user, in a case where the screen generation unit is notified that the different element program is being updated.

3. The information processing apparatus according to claim 2,
wherein the screen generation unit generates, as the first operation screen, a screen that receives, with no constraint, use of a function that does not use the different element program being updated, among the plurality of functions.

4. The information processing apparatus according to claim 2,
wherein the screen generation unit specifies the function that uses the different element program in accordance with information on correlation between each of the plurality of functions and one or more of the element programs used to implement the function.

5. The information processing apparatus according to claim 3,
wherein the screen generation unit generates a second operation screen for receiving selection of a function to be used, among the plurality of functions, from the user, and
in a case where a function selected by the user on the second operation screen uses the different element program being updated, the screen generation unit generates, as the first operation screen, a screen indicating that the function is unavailable.

6. The information processing apparatus according to claim 3, wherein the screen generation unit
generates, as the first operation screen, a screen indicating that a function, among the plurality of functions, is non-executable if the different element program, which the screen generation unit is notified as being updated, is executed not later than an accumulation process in a flow of processes executed for the function, and
generates, as the first operation screen, a screen indicating that a function is executable but that it takes time before completion if the different element program is executed later than the accumulation process in the flow of processes executed for the function.

7. The information processing apparatus according to claim 3, further comprising
a notification unit that notifies the user, who is operating the information processing apparatus when the first operation screen is displayed, that the function that uses the different element program has become available when such function has become available in response to the different element program being completely updated.

8. The information processing apparatus according to claim 7,
wherein the first operation screen includes an image element that requests the user to input whether or not the user desires to be notified when the function that uses the different element program has become available in response to the different element program being completely updated, and
the notification unit notifies the user when the function that uses the different element program has become available in response to the different element program being completely updated in a case where the user makes an input to be notified in response to the image element.

9. The information processing apparatus according to claim 1, further comprising
a history recording unit that records history information that indicates a status of use of each of the plurality of element programs, and
an update control unit that controls an update of the software in accordance with the history information.

10. The information processing apparatus according to claim 4, further comprising
a history recording unit that records history information that indicates a status of use of each of the plurality of element programs, and
an update control unit that controls an update of the software in accordance with the history information.

11. The information processing apparatus according to claim 9,
wherein the update control unit does not update the element program to be updated during a period for which a frequency of use of the element program is equal to or more than a threshold in the history information.

12. The information processing apparatus according to claim 9,
wherein the update control unit updates the element program to be updated in a particular case even during a period for which a frequency of use of the element program is equal to or more than a threshold in the history information, the update control unit updating the element program in units of each of element programs at a lower level that constitute the element program in the particular case.

13. The information processing apparatus according to claim 10,
wherein the screen generation unit generates a second operation screen for receiving selection of a function to be used, among the plurality of functions, from the user, and
wherein, even if a function selected by the user on the second operation screen uses the different element program being updated and therefore is unusable, the history recording unit records history information indicating that each element program to be used for the function is used at that time.

14. A non-transitory computer readable medium storing a program including a plurality of element programs stored in a hardware memory of an information processing apparatus, at least one of the plurality of element programs causing a processor of the information processing apparatus to:
execute a specific process upon detecting that a different element program is being updated by transmitting a process request to the different element program and determining that an acknowledgement is not returned from the different element program within a predetermined period of time, wherein the specific process includes suspending the process request and automatically re-sending the process request to the different element program upon detecting that the update of the different element program is completed.

15. An information processing apparatus comprising:
processing means; and
a hardware memory for storing software including a plurality of element programs to be executed by the processing means,
wherein at least one of the plurality of element programs causes the processing means to execute a specific process upon detecting that a different element program is being updated, the detection being performed by transmitting a process request to the different element program and determining that an acknowledgement is not returned from the different element program within a predetermined period of time, the specific process including suspending the process request and automatically re-sending the process request to the different element program upon detecting that the update of the different element program is completed.

* * * * *